US006564926B2

(12) United States Patent
Dubé et al.

(10) Patent No.: US 6,564,926 B2
(45) Date of Patent: May 20, 2003

(54) APPARATUS FOR HIGH SPEED LOADING OF ELONGATED MEMBERS

(75) Inventors: Richard Dubé, Saint-Nicolas (CA); Dany Blanchet, Sainte-Foy (CA)

(73) Assignee: Leggett & Platt Ltd., Waterloo (CA)

( * ) Notice: Subject to any disclaimer, the term of this patent is extended or adjusted under 35 U.S.C. 154(b) by 0 days.

(21) Appl. No.: 10/098,333

(22) Filed: Mar. 18, 2002

(65) Prior Publication Data

US 2003/0029698 A1 Feb. 13, 2003

(30) Foreign Application Priority Data

Aug. 10, 2001 (CA) ............................................. 2354951

(51) Int. Cl.$^7$ ............................................. B65G 47/04
(52) U.S. Cl. ................................ 198/459.5; 198/459.6; 198/463.5
(58) Field of Search ........................... 198/459.5, 459.6, 198/463.4, 463.5, 459.1, 459.2, 443, 608

(56) References Cited

U.S. PATENT DOCUMENTS

| 5,419,425 A | * | 5/1995 | Goater ................. 198/463.4 X |
| 5,813,512 A | * | 9/1998 | Andersson et al. ...... 198/459.5 |
| 5,921,376 A | * | 7/1999 | Michell et al. ...... 198/459.5 X |
| 6,431,345 B2 | * | 8/2002 | Burgener et al. .... 198/459.5 X |

* cited by examiner

Primary Examiner—James R. Bidwell
(74) Attorney, Agent, or Firm—Ogilvy Renault; Guy J. Houle

(57) ABSTRACT

An apparatus for singly loading perpendicularly conveyed elongated members from a first conveyor to a second conveyor. The apparatus is positioned downstream of the first conveyor and upstream of the second conveyor. The apparatus comprises plural stopper arms each analogously displaceable between an abutting position, wherein the stopper arms hold elongated members from moving forward on the first conveyor, and a bypassing position, wherein the stopper arms are disposed away from the first conveyor for allowing the elongated members to move forward as displaced by the first conveyor. Plural analogously moving lower loaders wheel each have a generally circular body with a gripping surface on an outer periphery thereof. The gripping surface is adapted for abutting an elongated member. Plural analogously moving upper loader wheels are generally positioned above the lower loader wheels and have a resilient peripheral portion. Plural stabilizer wheels are idle and adapted for lying on a top surface of an elongated members at least when the elongated member is abutted against the stopper arms. The apparatus is synchronized such that the elongated member is lifted by the gripping surfaces of the lower loader wheels when the stopper arms are moved to the bypassing position, whereby the elongated member is engaged between the gripping surfaces of the lower loader wheels and the stabilizer wheels or the resilient portions of the upper loader wheels while being transferred from the first conveyor to the second conveyor.

19 Claims, 5 Drawing Sheets

APPARATUS FOR HIGH SPEED LOADING OF ELONGATED MEMBERS

FIELD OF THE INVENTION

The present invention generally relates to wood processing equipment and, more particularly, to an apparatus for transferring and singly loading elongated lumber pieces from a side-by-side relationship on a first conveyor to a second conveyor.

BACKGROUND OF THE INVENTION

In typical sawmills, wherein raw wood is sawn mechanically into lumber pieces (i.e., planks, boards, etc.), much effort is spent in maximizing the productivity and output. Consequently, sawmills are increasingly automated in order to accelerate the speed of execution of the various tasks in the manufacturing of lumber pieces.

In one such task, lumber pieces which are disposed in side-by-side abutting relationship on a conveyor are singly spaced by being transferred to another conveyor. The spacing of the lumber pieces may, for instance, facilitate the individual sorting of the lumber pieces according to their quality.

U.S. Pat. Nos. 4,945,976, issued to Ritola on Aug. 7, 1990; U.S. Pat. No. 5,287,954, issued on Feb. 22, 1994 to Draghetti; U.S. Pat. No. 5,419,425, issued to Goater on May 30, 1995; U.S. Pat. No. 5,662,203, issued to St-Pierre et al. on Sep. 2, 1997; and U.S. Pat. No. 5,518,106, issued on May 21, 1996 to Allard, each disclose various apparatuses for transferring lumber pieces from a first conveyor to a second conveyor, thereby controlling the spacing therebetween. One of the goals of the apparatuses is to increase the speed and the reliability of the lumber piece transfer. However, as raw lumber is often bowed or twisted, and the corner edges are often bad due to wane, the reliability of the transfer decreases considerably as we attempt to increase the transfer speed. Most of these patents describe mechanisms which toss out pieces forward, with the result that the position and alignment of the lumber pieces on the outfeed conveyor is hard to control precisely, especially if the piece is warped, or slippery from being wet or iced.

A further patent, namely U.S. Pat. No. 5,813,512, issued on Sep. 29, 1998 to Andersson et al., also discloses an apparatus for spacing lumber pieces, but perhaps at a faster rate than the previously disclosed patents. This is achieved by a rotating wheel having a plurality of camming surfaces disposed at the junction of a pair of conveyors. A belt, extended between an idler pulley and a driver pulley, is generally positioned over the rotating wheel. A stop is located upstream of the rotating wheel so as to hold pieces of lumber fed by a first conveyor in a side-by-side relationship. Each of the camming surfaces of the rotating wheel is sized so as to lift a lumber piece above the stop and to pinch it against the belt. As the belt is resilient, the piece of lumber is held between the camming surface and the belt until the piece of lumber reaches the downstream second conveyor. It is pointed out that the rotating wheel and the belt, via the driver wheel, are both driven synchronously by a same motor, so as to have a same tangential speed at their periphery. Advantageously, lumber pieces travelling from a conveyor to another are held on both their bottom and top surfaces.

In order to maximize the rate in transferring and spacing of lumber pieces from a conveyor to another, a few design considerations are required. For one, the lumber piece has to be held securely, in at least two points on the lumber piece, at all times during the transfer. Another consideration is that the stop at the end of the infeed conveyor is sufficiently high to ensure an effective abutment of all the lumber pieces. However, the stop becomes an obstacle which the lumber pieces must surmount, thereby slowing the transfer process down. Furthermore, the lumber pieces ejected from the transfer apparatuses must stay perpendicular to the outfeed conveyor, whereby the operating speed of the transfer apparatuses is often slowed down when the lumber pieces being transferred are wet or iced to ensure this perpendicular positioning.

SUMMARY OF THE INVENTION

It is a feature of the present invention to provide an apparatus for transferring and singly loading elongated members from a first conveyor to a second conveyor which substantially overcomes the above-mentioned disadvantages.

According to the above feature of the present invention, and from a broad aspect thereof, the present invention provides an apparatus for singly loading perpendicularly conveyed elongated members from a first conveyor to a desired disposition on a second conveyor. The apparatus is positioned downstream of the first conveyor and upstream of the second conveyor. The apparatus comprises plural stopper arms each analogously displaceable between an abutting position, wherein the stopper arms hold elongated members from moving forward on the first conveyor, and a bypassing position, wherein the stopper arms are disposed below the first conveyor for allowing the elongated members to move forward as displaced by the first conveyor. Plural analogously moving lower loaders wheel each have a generally circular body with a gripping surface on an outer periphery thereof. The gripping surface is adapted for abutting an elongated member. Plural analogously moving upper loader wheels are generally positioned above the lower loader wheels and have a resilient peripheral portion. Plural stabilizer wheels are idle and adapted for lying on a top surface of an elongated members at least when the elongated member is abutted against the stopper arms. The apparatus is synchronized such that the elongated member is lifted by the gripping surfaces of the lower loader wheels when the stopper arms are moved to the bypassing position, whereby the elongated member is engaged between the gripping surfaces of the lower loader wheels and the stabilizer wheels or the resilient portions of the upper loader wheels while being transferred from the first conveyor to the second conveyor.

BRIEF DESCRIPTION OF THE DRAWINGS

A preferred embodiment of the present invention will now be described in detail having reference to the accompanying drawings in which.

DESCRIPTION OF THE PREFERRED EMBODIMENTS

Figure 1:
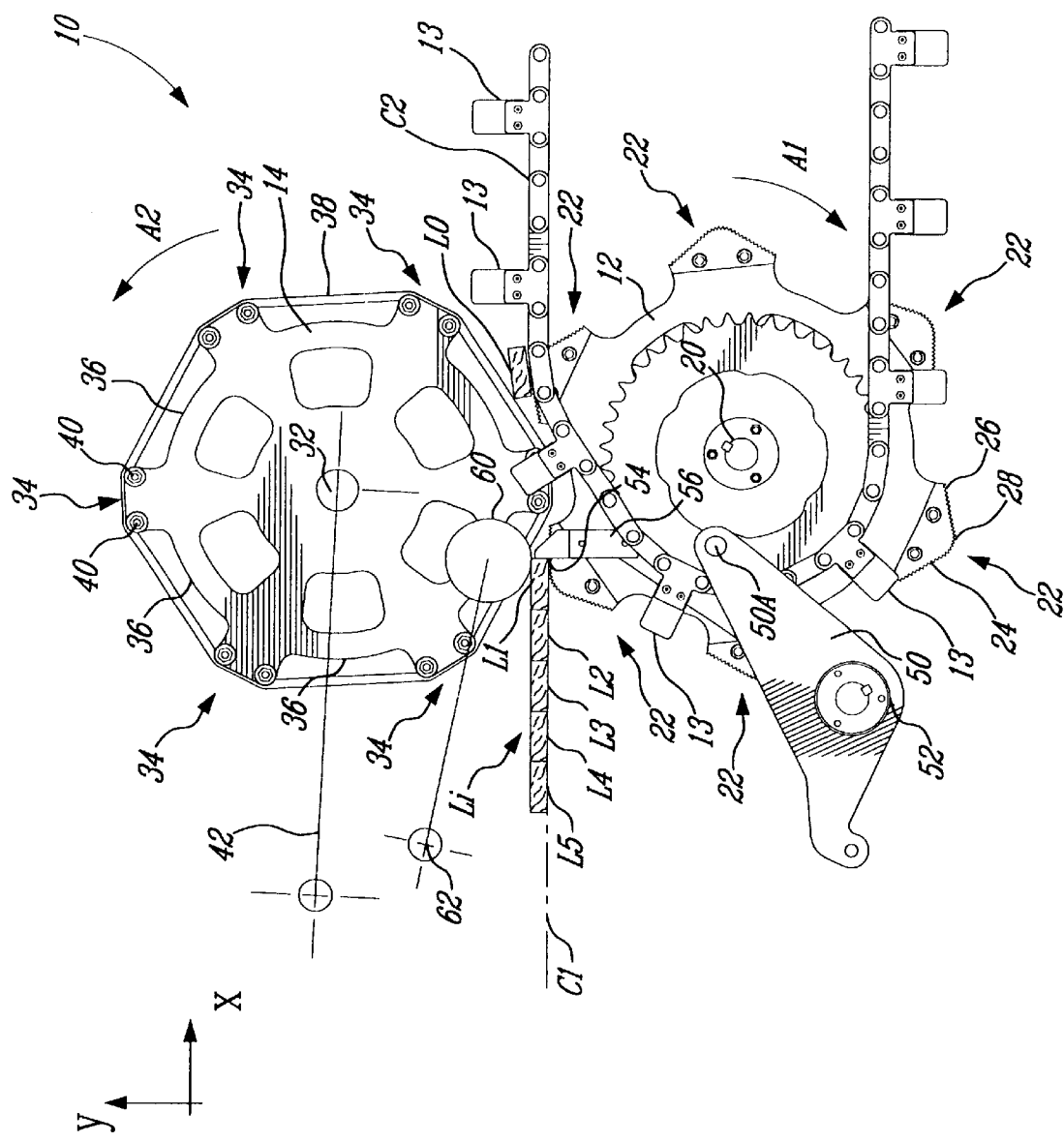
FIG. 1 is a side elevational view, with parts removed, of an apparatus for high speed loading of elongated members in accordance with the present invention.
Figure 2:
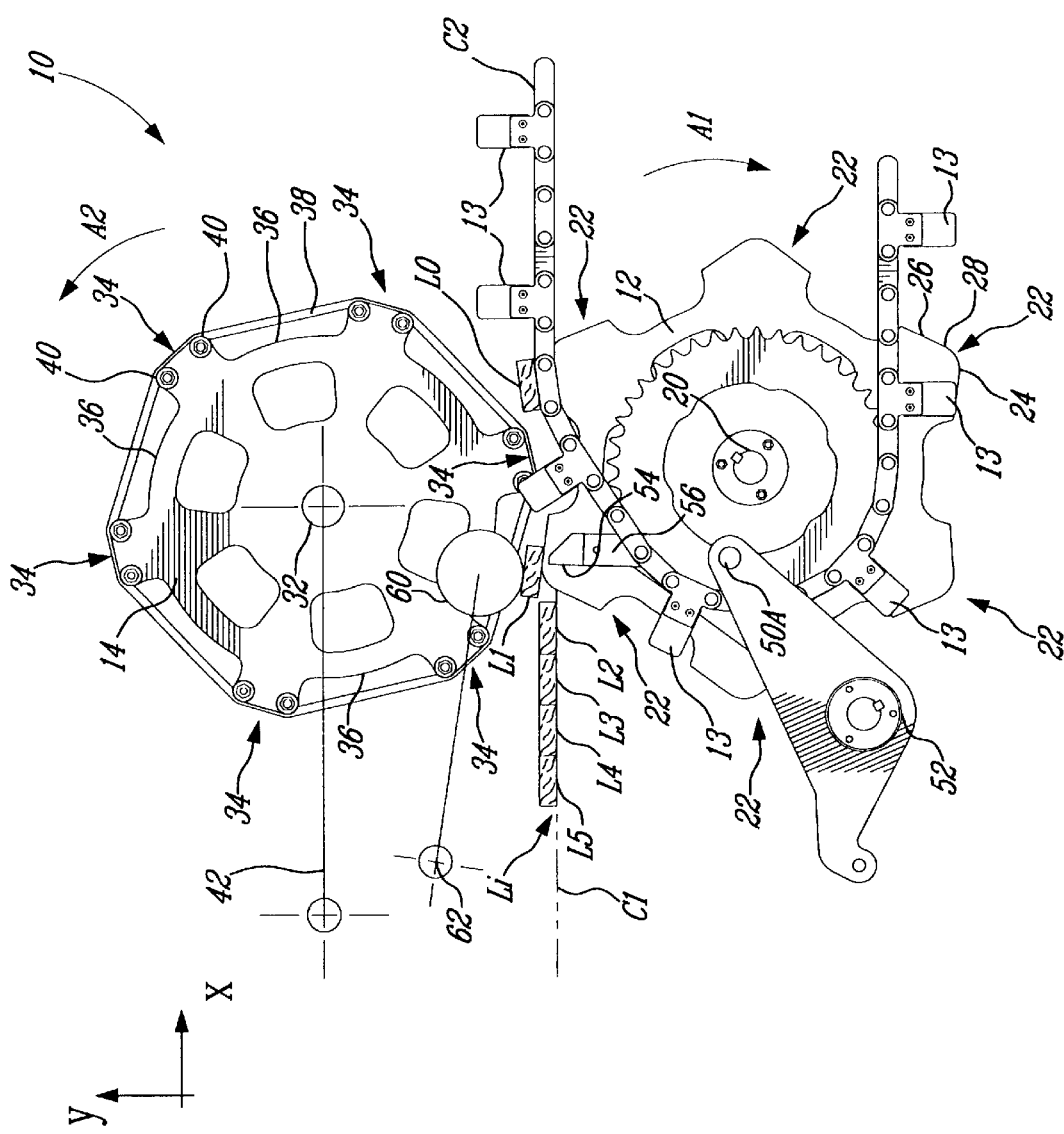
FIG. 2 is a side elevational view, with parts removed, of the apparatus of FIG. 1 during the transfer of a lumber piece.
Figure 3:
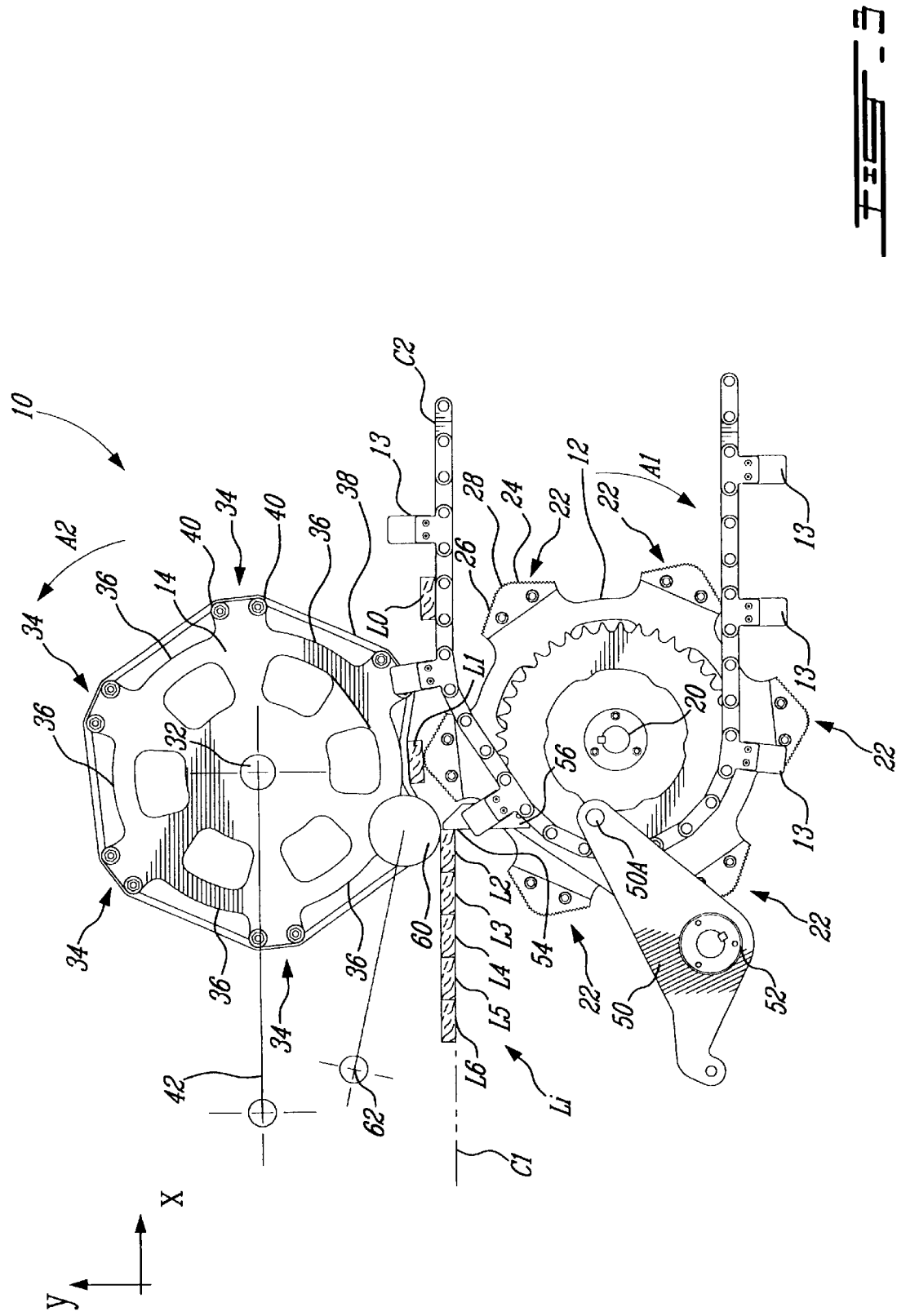
FIG. 3 is a side elevational view, with parts removed, of the apparatus of FIG. 1, further in the transfer of a lumber piece.
Figure 4:
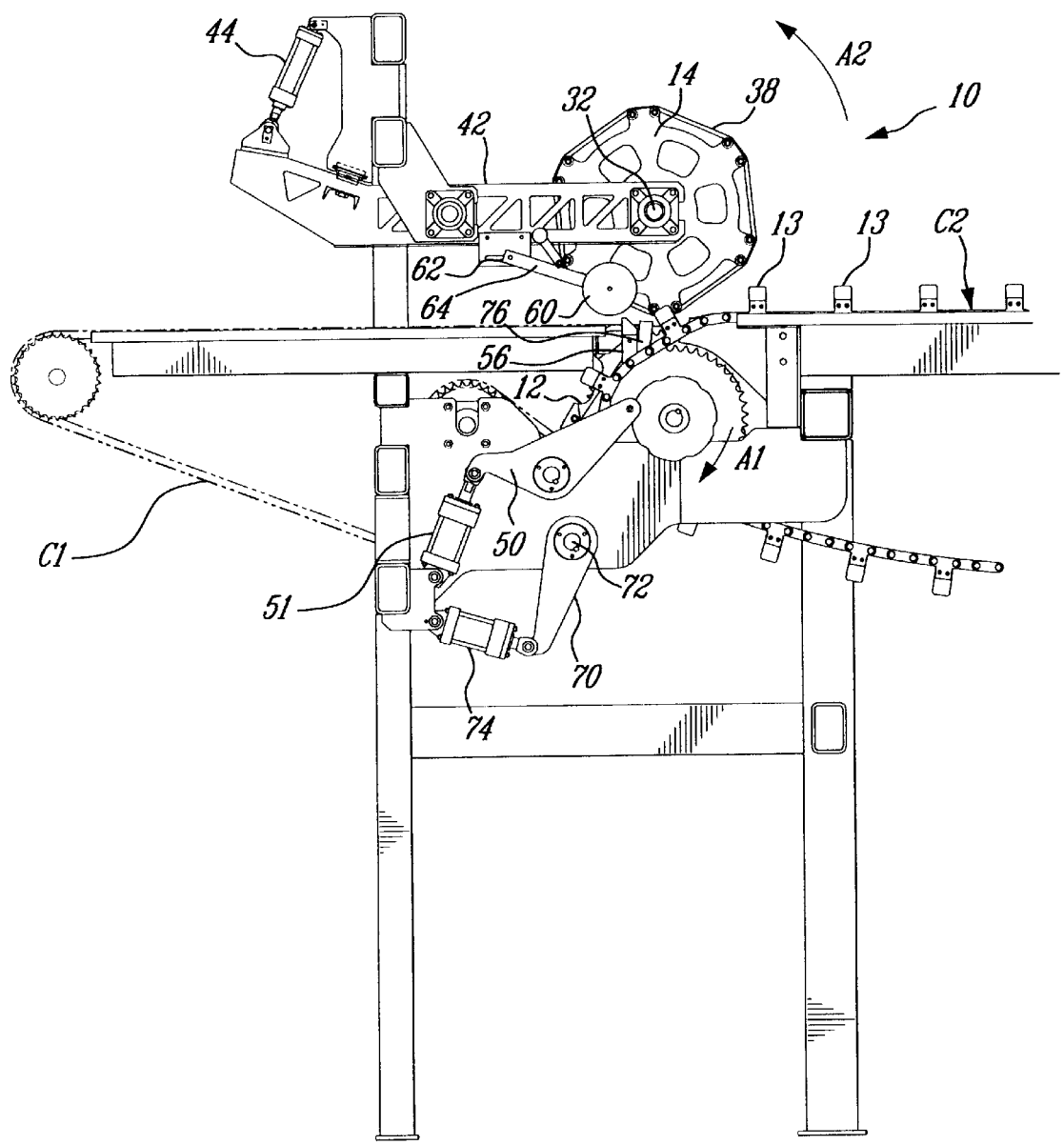
FIG. 4 is a side elevational view of the apparatus for selectively spacing elongated members.

According to the drawings and more particularly to FIG. 1, an apparatus for high speed loading of elongated members in accordance with the present invention is generally shown at 10, and will be referred to hereinafter as "apparatus 10" for simplicity purposes. The apparatus 10 is positioned between adjacent axially aligned conveyors. A downstream conveyor C2 is partly shown in FIG. 1, having lugs 13 thereon. An upstream conveyor C1 is shown in FIG. 4 and has been removed from FIGS. 1 to 3 for clarity purposes. However, dashed line C1 in FIGS. 1 to 3 illustrates the position of the top surface of the conveyor C1. Lumber pieces Li (i.e., i=1, 2, 3 . . . in the description and in the drawings) are conveyed in the direction shown by the positive X axis, and, thus, from conveyor C1 to conveyor C2. The lumber pieces Li are longitudinally perpendicular to the X axis and, thus, only end faces thereof are visible in FIGS. 1 to 4.

Still referring to FIG. 1, the apparatus 10 is shown having a lower loader wheel 12 and an upper loader wheel 14. The lower loader wheel 12 is rotated by a driver shaft 20 in the direction shown by arrow A1. The lower loader wheel 12 defines a generally circular shape with a plurality of gripping heads 22 projecting radially therefrom. The gripping heads 22 each have a leading surface 24 and a trailing surface 26, separated by a rounded apex 28 (i.e., in a radially projecting pyramidal-shape). The leading surface 24, the trailing surface 26 and the rounded apex 28 have a serrated surface.

The upper loader wheel 14 rotates in the direction shown by arrow A2 about the center of a shaft 32 to which it is secured. The upper loader wheel 14 defines a generally circular shape with a plurality of supports 34 projecting radially therefrom. Slots 36 are defined between the supports 34. A belt 38 is extended by the supports 34 around the periphery of the upper loader wheel 14. The supports 34 are preferably equipped with rounded edges in order to provide a smooth surface for receiving the belt 38 thereon. For instance, the edges may be provided with idle guide rollers 40 (as shown in FIGS. 1 to 4). The belt 38 consists of a resilient material, such as typical rubber plates, O-rings, or the like. Accordingly, as shown in FIG. 3, a lumber piece, herein lumber piece L1, is squeezed between the lower loader wheel 12 and the upper loader wheel 14 when transferring from conveyor C1 to conveyor C2 to provide positive engagement and prevent slippage. More specifically, the belt 38 biases the lumber piece L1 against the gripping head 22, whereby the belt 38 resiliently gives in or flexes in one of the slots 36. It is pointed out that other resilient members may be provided instead of the belt 38, such as elastics or cushions inserted in the slots 36. In any event, slots 36 and the gripping heads 22 are aligned so as to ensure the upper surface of the lumber pieces being transferred always has an optimal pressure exerted thereon.

As shown in FIG. 4, the upper loader wheel 14 is secured to the shaft 32, which is supported by an arm 42. The arm 42 may be displaced by a cylinder 44 in order to modify the position of the upper loader wheel 14, whereby the pressure exerted on the lumber pieces transferring from conveyor C1 to conveyor C2 may be varied. Accordingly, lumber pieces of various thicknesses may be transferred between the lower and upper loader wheels 12 and 14. Although not shown, the arm 42 has a low position locking device, to avoid the arm 42 bringing the upper loader wheel 14 too low needlessly.

Figure 5:
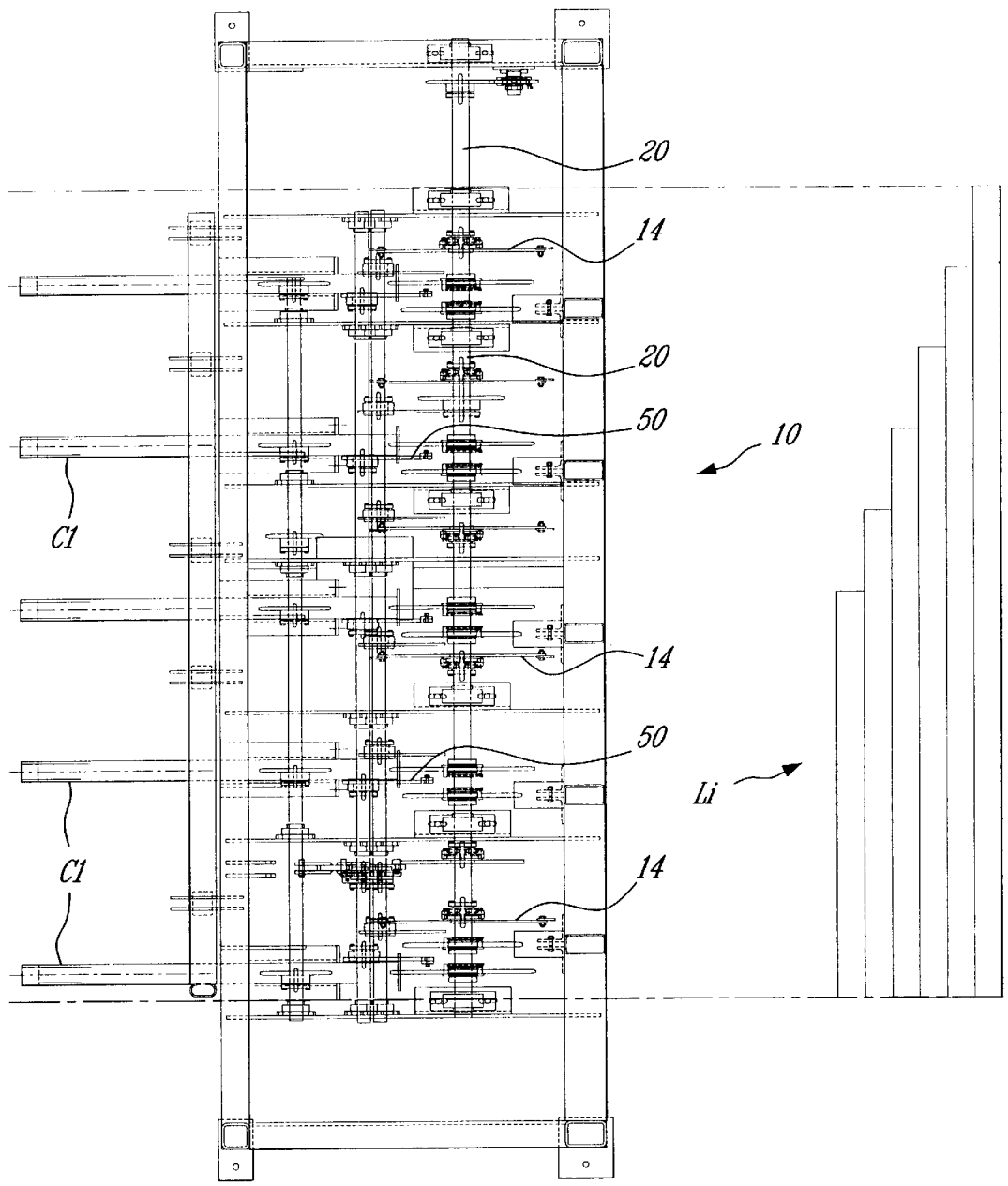
FIG. 5 is a top plan view of the apparatus of FIG. 4.

Referring now to FIG. 5, the apparatus 10 is shown having a plurality of lower loader wheels 12 (which are best seen in FIGS. 1 to 4 as they are below the upper loader wheels 14) and upper loader wheels 14, so as to exert pressure on the full length of the lumber pieces Li. Consequently, a lumber piece being transferred from conveyor C1 to conveyor C2 will be held at opposed ends by at least pairs of upper/lower loader wheels. It is pointed out that lumber pieces may be transferred from the conveyor C1 to the conveyor C2 by only having one section of the their length supported by the apparatus 10 (i.e., by having only one set of loader wheels 12 and 14). However, it is preferred to have juxtaposed components of the apparatus 10 (e.g., plural side-by-side loader wheels 12 and 14, as shown in FIG. 5) in order to have a more stable transfer of the lumber pieces from the conveyor C1 to the conveyor C2. The configuration of the apparatus 10 as depicted in FIG. 5 allows for lumber pieces of various lengths, which are illustrated, to be transferred from the conveyor C1 to the conveyor C2.

Returning now to FIG. 1, a stopper arm is generally shown at 50. The stopper arm 50 is secured to a shaft 52 so as to pivot therewith about the center of the shaft 52. The stopper arm 50 has an abutment surface 54 on a finger 56 thereof. The stopper arm 50 is displaceable between an abutting position and a bypass position. The stopper arm 50 is shown in the abutting position in FIGS. 1 and 3, wherein the abutment surface 54 emerges upwardly from conveyor C1 so as to hold lumber pieces Li from moving forward, although conveyed in the positive X axis direction by conveyor C1, which continues to move and slips under the bottom surfaces of the lumber pieces Li.

As depicted in FIG. 2, the stopper arm 50 is shown in the bypass position, whereat it is pivoted out of the lumber pieces Li's path. The stopper arm 50 is preferably displaced between its abutting position and its bypass position by a cam following mechanism 50A driving the shaft 52. As shown in FIG. 4, a cylinder 51 is provided for ensuring an adequate contact pressure between the stopper arm 50 and the cam mechanism. Also, similarly to the wheels 12 and 14, the shaft 52 comprises a plurality of stopper arms 50 on the width of the apparatus 10, as shown in FIG. 5, so as to abut against at least a pair of points on the lumber pieces Li. As the stopper arm 50 is retractable, it is not in the path of the lumber pieces being transferred. Accordingly, this allows the apparatus 10 to have a high enough stopper, for irregular lumber pieces, yet without the latters having to surmount the stopper.

As shown in FIGS. 1 to 4, a stabilizer wheel 60 exerts pressure on the foremost of the lumber pieces accumulated against the stopper arm 50. The stabilizer wheel 60 pivots around point 62 through an arm 64, and lies both by gravity and by the pressure exerted thereon by a compression device (not shown) such as a spring, on the foremost lumber piece, whereby the latter may move upwardly with the stabilizer wheel 60 lying thereon when carried by one of the gripping heads 22. As seen in FIG. 5, the apparatus 10 has a plurality of stabilizer wheels 60 exerting pressure on various points of the length of the foremost lumber piece.

Now that the apparatus 10 has been described, the transfer of lumber pieces from conveyor C1 to conveyor C2 will be explained, having reference to FIGS. 1 to 3. As shown in FIG. 1, lumber pieces L1 to L5 are held side by side by the abutment surface 54 of the stopper arm 50. The lumber pieces L1 to L5 have accumulated against the abutment surface 54 by being displaced in the positive X axis direction by conveyor C1, which continues to move in slipping engagement. The lower loader wheels 12 rotates in a clockwise direction, as shown by arrow A1, whereas the upper loader wheels 14 rotate oppositely in a counterclockwise direction as shown by arrow A2. The lower loader wheels 12 and the upper loader wheels 14 are synchronized such that their peripheral speeds are the same. Preferably, the lower loader wheels 12 and the upper loader wheels 14 are driven by a same motor (not shown) through chains and sprockets, such that the wheels 12 and 14 always have the same tangential speed at their periphery, notwithstanding the motor output, and remain synchronized to one another. Furthermore, the stopper arm 50 is synchronized by the cam following mechanism 50A in order to move from its abutting position, as shown in FIG. 1, to its bypassing position, as shown in FIG. 2, when one of the gripping heads 22 of the lower loader wheel 12 is on the verge of coming into contact with the foremost lumber piece.

Referring to FIG. 2, lumber piece L1 is moved from conveyor C1 upwardly by being abutted by the leading surface 24 of one of the gripping heads 22. The lumber piece L1 is held between the gripping head 22 and the stabilizer wheel 60, which moves up, as explained above. The stopper arm 50 is in its bypassing position to allow the gripping head 22 to catch the lumber piece L1.

Referring now to FIG. 3, the lumber piece L1 is shown having been tilted and being held between the rounded apex 28 of the gripping head 22 and the belt 38. The stopper arm 50 has returned to its abutting position in order to hold lumber piece L2 as the new foremost lumber piece. The loader wheels 12 and 14 will carry lumber piece L1 therebetween until lumber piece L1 reaches conveyor C2. As shown in FIG. 1, a lumber piece L0 is shown being released from the hold between the lower loader wheel 12 and the upper loader wheel 14 so as to reach conveyor C2, and, in the case where the conveyor C2 has lugs P, abut one of the lugs P.

Referring to FIG. 4, a restocking arm 70 is shown pivotally mounted at 72. The restocking arm 70 is actuated by a cylinder 74 at a lower end thereof, and has an abutment edge 76 at an upper end thereof. The restocking arm 70 is displaceable between a restocking position (not shown), and a dodging position, which is depicted in FIG. 4. The motion of the restocking arm 70 is controlled by a sensor (e.g., photocell, limit switch or the like), which is positioned above or below the conveyor C1, to ensure that the amount of lumber pieces awaiting to go through the apparatus 10 is not below a predetermined quantity. It may be desired to have at least a certain amount of lumber pieces at the output of the apparatus 10 for bundle size considerations, or for having an output stability.

When the restocking arm 70 is in the restocking position, it is upstream of the stopper arm 50. Therefore, the lumber pieces accumulate against the restocking arm 70 rather than against the stopper arm 50. Once the amount of lumber pieces is above the predetermined quantity, the restocking arm 70 is retracted back to the dodging position.

Accordingly, by controlling the rotational speed of the lower loader wheel 12 and the upper loader wheel 14, a constant spacing is ensured between the lumber pieces being transferred from conveyor C1 to conveyor C2. In order to simplify the control of the tangential speeds of the loader wheels 12 and 14, these are driven by the same motor (not shown), as explained above. In the preferred embodiment, all components are driven by the motor (not shown) through the lower shaft 20.

The combination of the stabilizer wheel 60 and the loader wheels 12 and 14 ensures that pressure is always exerted on both the bottom and the upper surfaces of lumber pieces Li. This allows the safe transfer of the lumber pieces between conveyors C1 and C2. More specifically, the lumber pieces on the gripping heads 22 roll or pivot from the leading surface 24 to the trailing surface 26 through the rounded apex 28. On the other hand, the belt 38 embraces the top surfaces of the lumber pieces. The serrated surfacing of the gripping heads 22 ensures the positive grip of the lumber pieces.

The conveyor C2 may also be driven by the same motor as the lower loader wheel 12 and the upper loader wheel 14. If the conveyor C2 has lugs, as illustrated in FIG. 1, the synchrony between the conveyor C2 and the wheels 12 and 14 may ensure that lumber pieces are disposed between the lugs 13.

The configuration of the upper loader wheel 14 has advantages in that the resilient member which embraces the top surface of the lumber pieces transferring from conveyor C1 to conveyor C2 is restricted to that purpose. It is not required to drive an idle pulley, as is the case in the prior art, and therefore does not need to be as stiff as belts serving the dual purposes, thereby allowing the belt 38 of the apparatus 10 to better embrace the top surface of the lumber pieces. Furthermore, the fact that the center of the loader wheel 14 is displaceably adjustable through arm 42 ensures that an optimal pressure is exerted on the lumber pieces being transferred from conveyors. This upper wheel configuration is simple, as it substantially reduces the amount of parts required and the motor output transmission has only one shaft above the conveyors (i.e., the shaft 32) to drive. The optimizing of the pressure exerted on the top surface of the lumber pieces allows an optimal gripping of the lumber pieces between the loader wheels 12 and 14.

It has also been thought to provide individual resilient members covering each slot 36 (e.g., elastics, resilient pads in the slots 36), whereby the resilient members could easily be replaced.

As shown in FIG. 4, the stopper arm 50 may be provided with additional cylinders which will act as dampers in order to smooth out the motion of stopper arm 50. It is pointed out that the apparatus 10 is adapted for the transfer of most any elongated members across conveyors, and of various lengths (i.e., as shown, lumber pieces ranging between 60" and 120" in the apparatus 10 of FIG. 5). The fact that the upper loader wheel 14 is displaceable allows for various elements to be transferred across the apparatus 10. Therefore, the apparatus 10 is adapted for transferring and singly loading lumber pieces from a conveyor to another at high speeds. The upper loader wheel 14 configuration, as well as the synchronous driving of the apparatus 10, may allow up to 240 lumber pieces to be transferred per minute. As the various components of the apparatus 10 are all driven by a same motor and through sprockets and chains, the speeds of operation of the various components will always be synchronised with respect one to another. Therefore, the drive motor may be modulated to operate at given speeds, whereby the apparatus 10 will respond automatically by having its moving components adapt in synchrony.

It is within the ambit of the present invention to cover any obvious modifications of the embodiments described herein, provided such modifications fall within the scope of the appended claims.

What is claimed is:

1. An apparatus for singly loading perpendicularly conveyed elongated members from a first conveyor to a second conveyor, said apparatus being positioned downstream of said first conveyor and upstream of said second conveyor, said apparatus comprising:

at least one stopper arm displaceable between an abutting position, wherein said stopper arm holds at least one elongated member from moving forward on said first conveyor, and a bypassing position, wherein said stopper arm is disposed away from said first conveyor for allowing said elongated member to move forward as displaced by said first conveyor;

at least one lower loader wheel having a generally circular body with a gripping surface on an outer periphery thereof, said gripping surface being adapted for abutting an elongated member;

at least one upper loader wheel generally positioned above said lower loader wheel and having a resilient peripheral portion; and at least one stabilizer wheel being idle and adapted for lying on a top surface of said elongated member at least when said elongated member is abutted against said stopper arm;

said apparatus being synchronized such that said elongated member is lifted by said gripping surface of said lower loader wheel when said stopper arm is moved to said bypassing position, whereby said elongated member is engaged between said gripping surface of said lower loader wheel and at least one of said stabilizer wheel and said resilient portion of said upper loader wheel while being transferred from said first conveyor to said second conveyor.

2. The apparatus according to claim 1, wherein a plurality of sets of said loader wheels, stopper arms and stabilizer wheels are juxtaposed in a spaced-apart manner and synchronized so as to support said elongated members on at least opposed end sections during transfer from said first conveyor to said second conveyor.

3. The apparatus according to claim 2, wherein each said elongated member transferred from said first conveyor to said second conveyor is received between lugs of said second conveyor.

4. The apparatus according to claim 3, wherein said at least one lower loader wheel, said at least one upper loader wheel, said at least one stopper arm, and said second conveyor are synchronized by being operated by a single motor.

5. The apparatus according to claim 4, wherein said single motor has a sprocket and chain drive.

6. The apparatus according to claim 1, further comprising a restocking arm displaceable between a restocking position, wherein said restocking arm has an end portion thereof upstream of said stopper arm for a predetermined quantity of elongated members to accumulate prior to being fed to said stopper arm, and a dodging position, wherein said restocking arm is positioned to avoid interfering with said elongated members.

7. The apparatus according to claim 1, wherein said stopper arm is pivoted by a cam and follower assembly for being displaced between said abutting position and said bypassing position.

8. The apparatus according to claim 1, wherein said gripping surface of said lower loader wheel is comprised by plural gripping heads.

9. The apparatus according to claim 8, wherein said gripping heads are pyramidal-shaped heads which project radially from said lower loader wheel.

10. The apparatus according to claim 9, wherein said pyramidal-shaped heads each have a leading surface, a trailing surface and a rounded apex therebetween.

11. The apparatus according to claim 10, wherein said gripping heads each have a serrated outer surface.

12. The apparatus according to claim 1, wherein said resilient member of said upper loader wheel bridges slots defined in said outer periphery of said upper loader wheel.

13. The apparatus according to claim 12, wherein said resilient member is a belt stretched around said outer periphery of said upper loader wheel.

14. The apparatus according to claim 13, wherein said belt is supported by idle guide rollers secured to said outer periphery of said upper loader wheel.

15. The apparatus according to claim 12, wherein said gripping surface of said lower loader wheel is comprised by plural gripping heads each aligned in rotation with one of said slots of said upper loader wheel, whereby an elongated member held therebetween is received against said resilient member in one of said slots.

16. The apparatus according to claim 1, wherein said upper loader wheel is displaceable with respect to said lower loader wheel, so as to adapt said apparatus for transferring elongated members of various cross-sections from said first conveyor to said second conveyor.

17. The apparatus according to claim 1, wherein said elongated members are lumber pieces.

18. The apparatus according to claim 1, wherein each said elongated member is received in abutment against a lug of said second conveyor.

19. The apparatus according to claim 1, wherein said at least one lower loader wheel, said at least one upper loader wheel, and said at least one stopper arm are synchronized by being operated by a single motor.

* * * * *